United States Patent [19]
Miskiewicz

[11] 3,898,066
[45] Aug. 5, 1975

[54] AIR FILTER ASSEMBLY

[76] Inventor: Leonard A. Miskiewicz, 219 Sprucewood St., Pittsburgh, Pa. 15210

[22] Filed: Jan. 7, 1974

[21] Appl. No.: 431,298

[52] U.S. Cl. .................. 55/317; 55/337; 55/352; 55/405; 55/459; 55/509; 55/510; 55/DIG. 28
[51] Int. Cl. ............................................. B01d 50/00
[58] Field of Search ............ 55/351, 352, 404, 405, 55/459, 509, 510, DIG. 28, 317, 337

[56] References Cited
UNITED STATES PATENTS

| | | | |
|---|---|---|---|
| 624,592 | 5/1899 | Whitney | 55/405 |
| 851,254 | 4/1907 | Rothenbucher | 55/405 |
| 1,302,716 | 5/1919 | Sargent | 55/DIG. 28 |
| 1,806,898 | 5/1931 | Goodloe | 55/352 X |
| 3,186,389 | 6/1965 | Sylvan | 55/351 X |
| 3,402,881 | 9/1968 | Moore et al. | 55/405 X |
| 3,421,294 | 1/1969 | Sherburn | 55/459 X |
| 3,447,290 | 6/1969 | Flory | 55/337 X |
| 3,654,748 | 4/1972 | Bloom | 55/509 X |

*Primary Examiner*—Frank W. Lutter
*Assistant Examiner*—Kathleen J. Prunner
*Attorney, Agent, or Firm*—Brown, Murray, Flick & Peckman

[57] ABSTRACT

An air filter assembly includes a housing within which an annular filter element is supported for rotation. Turbine blades extend from cover plates at the top and bottom surfaces of the filter element. An air feed pipe opens out of the side wall of the housing for directing incoming air in a direction tangentially toward the annular filter element for contact with the turbine blades extending therefrom. In one form of the present invention, the filter element is rotatably supported by bearing surfaces carried by the bottom wall of the housing. In a second form, the filter element is rotatably supported by interfitting annular flanges, one extending from the top surface of the filter and the other flange projecting from a cover used to enclose the housing.

8 Claims, 5 Drawing Figures

PATENTED AUG 5 1975  3,898,066

AIR FILTER ASSEMBLY

BACKGROUND OF THE INVENTION

This invention relates to an air filter assembly wherein there is provided means to direct a stream of incoming air in a tangential relation toward a filter element to contact blade surfaces extending therefrom for rotating the filter to improve the efficiency thereof.

In the past, air filter assemblies essentially included a hollowed-out housing with an annular gasket on its floor surface surrounding an air discharge port therein for filtered air. The gasket was used to form an air-tight seal with the bottom surface of the annular filter element which was also sealed in an air-tight manner by an annular gasket provided on a cover for the housing. In this way, the incoming air delivered through the side wall of the housing was constrained to pass only through the filter element. The filtered air was discharged through the opening in the bottom wall of the housing. It has been the usual practice to arrange an air feed pipe to open out of the side wall of the housing so that the incoming air stream was generally perpendicular to the most adjacent face surface of the filter element.

I have discovered that this construction has brought about a very inefficient air filter assembly because the incoming air passing into the housing is drawn preferentially through the immediate peripheral surface of the filter element most adjacent to the air inlet pipe. As a result, a very small segment of the filter element is used extensively to filter the air while the remaining segmental portion of the filter element contributes far less to the filtering of air. Stated differently, the filter element is used extensively to filter air through a segment of about 90° which is made up of 45° segments at either side of the air delivery pipe. As this portion of the air filter becomes clogged, the passage of air through the filter progressively decreases to the extent that an increasingly larger portion of the air must pass a longer distance around the filter before passing through the filter element, thus further increasing the air friction within the filter housing and reducing the amount of air that can be supplied to the internal combustion engine, for example. This, of course, deprives the internal combustion engine of vitally needed air to effect efficient and complete combustion of the gas-air mixture. Fuel is, therefore, wasted and at the same time hazardous pollution is generated.

SUMMARY OF THE INVENTION

It is, therefore, an object of the present invention to provide an improved air filter assembly for the greater utilization of the filtering capacity of a filter element to consistently provide large volumes of filtered air over longer periods of time without the need to replace the filter element itself.

It is a further object of the present invention to provide an air filter assembly wherein a housing with an enclosing side wall receives a rotatably supported filter element adapted for rotation within the housing by utilizing the stream of incoming air passing through the side wall to rotate the filter for greater utilization of the filtering area provided by the filter element itself.

It is a further object of the present invention to provide a relatively inexpensive construction and relationship of parts for rotating a filter element for the greater utilization of its filtering surface to consistently provide large volumes of filtered air over longer periods of time before replacing the filter element.

It is a further object of the present invention to provide an improved filter assembly wherein the filter element forming part thereof is constructed and arranged with parts for rotatably supporting it within a housing such that the filter element can be replaced from time-to-time without requiring the efforts of highly skilled workmen or the like.

According to one form of the present invention, there is provided an air filter assembly comprising housing means including an annularly shaped side wall extending from a bottom wall which is provided with an air discharge port for the passage of filtered air from the housing, an annularly shaped filter element facing toward the side wall, a cover plate for enclosing the top surface of the filter element, a plurality of turbine blades extending between the filter element and the side wall of the housing, a face surface of each blade lying in a plane intersecting the bottom wall of the housing, the housing includes a cover joined to its side wall for enclosing the filter element, means for rotatably supporting the filter element within the housing, and means for directing a stream of air into the housing in a tangential direction toward the annularly shaped filter element for rotating the filter element.

These features and advantages of the present invention as well as others will be more readily apparent when the following description is read in light of the accompanying drawings, in which.

Figure 1:
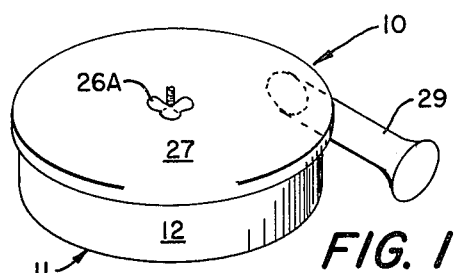
FIG. 1 is a perspective view of a filter assembly embodying the features of the present invention.
Figure 3:
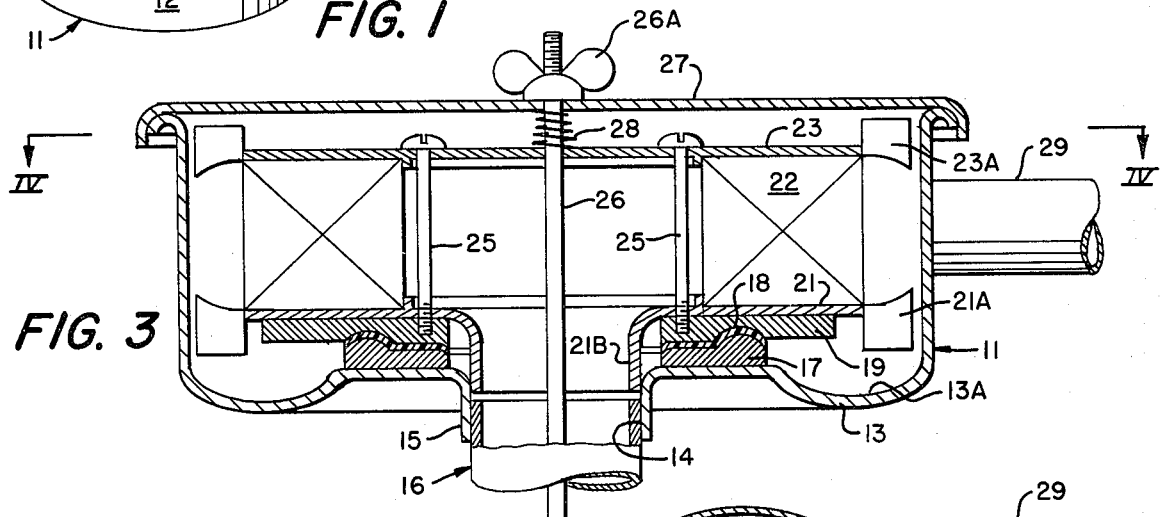
FIG. 3 is a sectional view taken along line III—III of FIG. 2.
Figure 2:
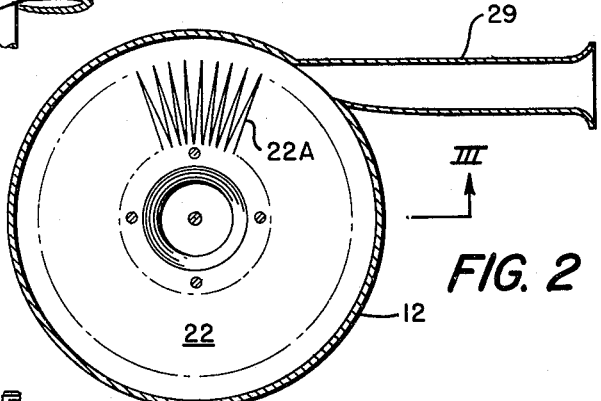
FIG. 2 is a plan view of the filter assembly and illustrating in greater detail the filter element located within the housing therefor.

In FIGS. 1, 2 and 3, there is illustrated a filter assembly 10 including a hollowed-out housing 11 made up of an upstanding side wall 12 from a bottom wall 13 wherein an annular portal opening 14 is provided for the discharge of filtered air. A collar 15 surrounds the opening 14 at the outside surface of the bottom wall. A carburetor, for example, has a throat 16 to which the collar 15 is adjoined in a well-known manner. The bottom wall 13 includes an annular trough 13A which may receive, if desired, quantities of oil to form a reservoir for the accumulation of finely-divided solid particles filtered out of the air passing through the housing. Between the trough 13A and the portal opening 14, the bottom wall carries anti-friction means to rotatably support a filter element. The anti-friction means illustrated in FIG. 3 includes an annular ring 17 having a recessed upper surface which is preferably coated with an anti-friction material 18 onto which there is provided an annular plate 19. The material 18 is selected from such well-known materials as, for example, TEFLON (Trademark), grease or a film of oil. It will be apparent to those skilled in the art that other forms of anti-friction means may be provided such as ball bearings supported in a plate for relative rotation between the annular ring 17 and plate 19. The plate 19 supports an annular plate 21 that forms an enclosure for the bottom surface of a filter element 22 that is, in turn, enclosed at its upper surface by a cover plate 23. The filter element 22 is of the conventional well-known construction which includes radially extending folds of filter material 22A with the outer folded ends facing toward the wall 12 as best shown in FIG. 2.

Figure 4:
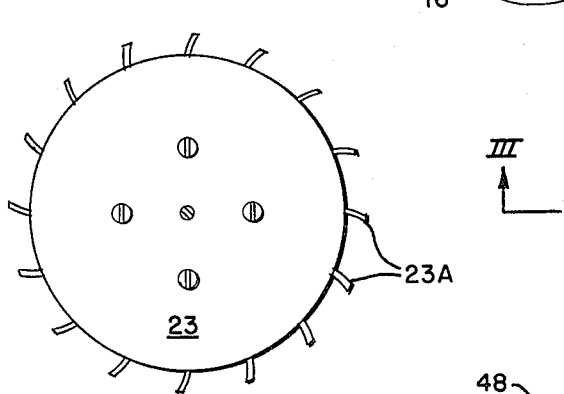
FIG. 4 is a plan view taken along line IV—IV of FIG. 3.

In accordance with the present invention, the cover plate 23 and/or the annular plate 21 are provided with a plurality of tubine blades in a spaced-apart relation about their outer edges. In the preferred form, these blades extend beyond the filter element so as to lie between it and the side wall of the housing. As best shown in FIGS. 3 and 4, the turbine blades 23A and 21A include facing surfaces which lie in planes that intersect the bottom wall 13. In other words, the facing surfaces of the turbine blades lie in planes that are generally perpendicular to the bottom wall 13. The blades may, however, be disposed such that their facing surfaces form acute angles with the bottom wall 13 without departing from the spirit of the present invention.

The filter element 22 is positioned within flanged shoulders on both of the plates 21 and 23 whereby it is centered and then clamped between these plates by means of bolt-type fasteners 25. Extending vertically from the throat 16 of the carburetor is a rod 26 having a threaded end to receive a wing nut 26A used to hold a housing cover plate 27 onto the upper edge of the wall 12. A spring 28 is located between the cover plate 27 and the cover plate 23 to urge the filter in a downward direction under sufficient pressure to maintain an anti-friction contact relation between plate 19 and ring 17. At the same time, a collar-like flange 21B extending from the annular opening in the plate 21 is urged into the portal opening 14 formed in the bottom wall 13.

An air feed pipe 29 delivers a stream of air through an opening in the side wall 12. The opening in this pipe is aligned in a generally tangential relation with the annular shape of the filter element 22. In this manner, the stream of air passing from the pipe 29 contacts the turbine blades 23A and 21A, thereby causing the filter element 22 to rotate within the housing. This continuously changes surfaces of the filter element facing toward the air stream entering into the housing. If desired, sufficient friction may be created between the filter element and its support structure so that the filter element will not continuously rotate but, instead, will rotate in a periodic manner depending upon, for example, sudden large changes in the air pressure within the housing.

Figure 5:
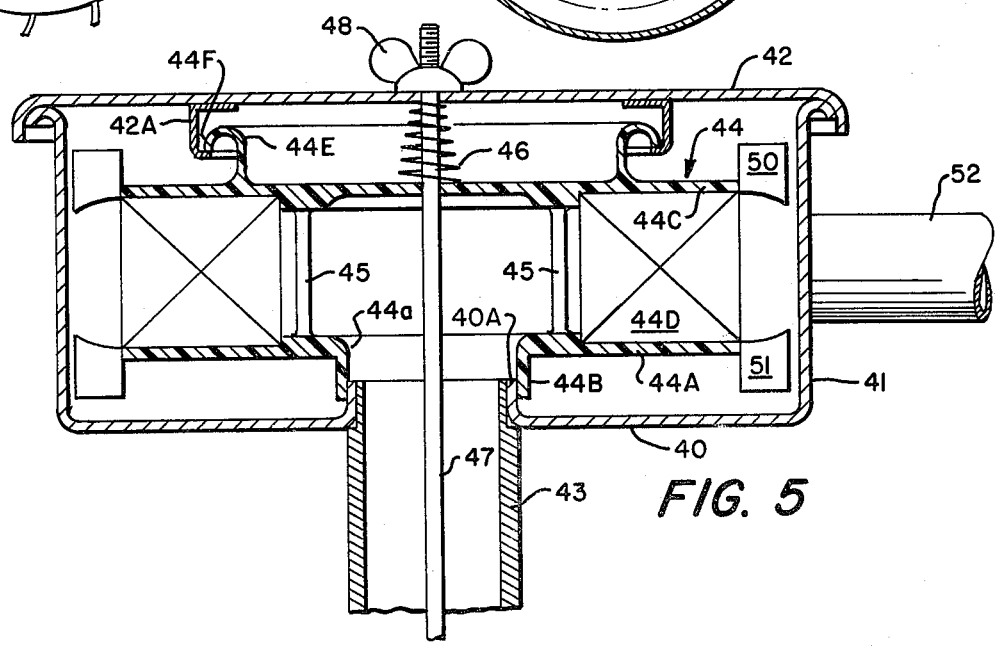
FIG. 5 is a sectional view similar to FIG. 3 but illustrating a second form of the present invention.

FIG. 5 illustrates a second embodiment of the present invention which differs in its essential aspect from that already described in respect to the parts used to rotatably support the air filter element. As illustrated in FIG. 5, the air filter assembly includes a housing with a bottom wall 40 having an annular side wall 41 that receives along its top edge a cover plate 42. In the housing, the bottom wall 40 has a flange 40A which defines an air discharge port for delivery of filtered air to a throat in a carburetor housing 43. An air filter unit 44 includes an annular bottom plate 44A having an air discharge opening projected downwardly by a flange 44B. A top plate 44C encloses the top surface of a filter element 44D. The top plate 44C and the annular plate 44A are joined together by ribs 45 extending between them, all of which are preferably made by molding plastic material.

Extending upwardly from the top plate 44C is an annular collar 44E having an enlarged flange 44F at its upper end for rotational support by a downwardly extending ring with a flange 42A carried by the cover plate 42. A spring 46 is used to urge the filter unit 44 downwardly and thereby maintain the enlarged flange 44F in supporting contact with the flange 42A. The spring 46 is preferably secured at its lower end to the filter unit to facilitate the assembly of this unit. A rod 47 has a threaded end to receive a nut 48 used to hold the cover 42 on the housing.

The top cover 44C and the annular plate 44A have a plurality of turbine blades 50 and 51, respectively, constructed and arranged in the manner already described in regard to FIG. 1–4. An air delivery pipe 52 is constructed and arranged as already described in regard to the air delivery pipe 29 of FIGS. 1–4 for delivering a stream of air in a tangential relation with the edge of the filter element and thereby impart rotary motion to the filter unit. In FIG. 5, the filter unit is supported by the flange 44E of the housing cover plate 42. In FIGS. 1–4 and 5 the side walls of the housings may be made as an integral part of the housing cover plates, in which event the side walls will be clamped to the illustrated and described bottom walls.

Although the invention has been shown in connection with certain specific embodiments, it will be readily apparent to those skilled in the art that various changes in form and arrangement of parts may be made to suit requirements without departing from the spirit and scope of the invention.

I claim as my invention:
1. An air filter assembly comprising:
   housing means including an annularly shaped side wall upstanding from a bottom wall, said annularly shaped side wall having an air inlet opening for the entrance of air into said housing, said bottom wall having an air discharge port for the passage of filtered air from said housing;
   an annularly shaped filter element with filtering surfaces facing toward said annular side wall;
   a cover plate for enclosing the top surface of said filter element;
   a plurality of turbine blades extending outwardly beyond the outer annular edge of the cover plate and located between said filter element and said side wall of the housing means, said turbine blades being drivingly coupled via the cover plate to said filter element for rotating it within the housing, the facing surfaces of said blades lying in planes intersecting said bottom wall;
   said housing including a cover joined to the side wall for enclosing said filter element;
   means for rotatably supporting said annular filter element within said housing means;
   an annular plate enclosing the bottom surface of said filter element, said annular plate including means surrounding a centrally located annular port therein and extending into a rotatable and enclosing relation with said air discharge port for delivering filtered air into the air discharge port; and
   means for directing a stream of air through the inlet opening in said side wall into said housing means in a generally tangential direction toward said annularly shaped filter element for impinging contact with said turbine blades to rotate said filter element to change filtering surfaces thereof directed toward the stream of air.

2. An air filter assembly according to claim 1 wherein said means surrounding the annular port in the annular plate includes a collar projecting into said air discharge port.

3. An air filter assembly according to claim 1 wherein said means for rotatably supporting said annular filter element includes an anti-friction bearing means located between said annular plate and said bottom wall to rotatably support said annular filter element within said housing means.

4. An air filter assembly according to claim 1 further comprising resilient means for urging said annular filter element in a direction toward the bottom wall of said housing means.

5. An air filter according to claim 1 further comprising means for joining said cover plate and said annular plate at opposite sides of said filter element.

6. An air filter assembly according to claim 1 wherein said means for rotatably supporting said annular filter element includes an annular collar projecting upwardly from said cover plate, a flange projecting from said annular collar, and a ring extending downwardly from and supported by said housing cover, said ring having a flanged end to rotatably support the flange of said annular collar.

7. The filter assembly according to claim 1 wherein at least some of said plurality of turbine blades are supported by and extend from said annular plate.

8. An air filter assembly according to claim 1 wherein said means for rotatably supporting said annular filter element include flange means extending from said cover plate, and means extending downwardly from said housing cover for rotatably supporting said flange means.

* * * * *